US012371793B2

(12) United States Patent
Tanabe et al.

(10) Patent No.: US 12,371,793 B2
(45) Date of Patent: Jul. 29, 2025

(54) METHOD FOR FORMING SILICA-BASED MULTILAYER COATING ON SUBSTRATE FROM POLYSILAZANE-CONTAINING COMPOSTIONS

(71) Applicant: TOCALO CO., LTD., Hyogo (JP)

(72) Inventors: Takaomi Tanabe, Hyogo (JP); Seiichiro Kawachi, Hyogo (JP); Kosaku Hiyama, Hyogo (JP)

(73) Assignee: TOCALO CO., LTD., Hyogo (JP)

( * ) Notice: Subject to any disclaimer, the term of this patent is extended or adjusted under 35 U.S.C. 154(b) by 54 days.

(21) Appl. No.: 18/269,077

(22) PCT Filed: Nov. 11, 2021

(86) PCT No.: PCT/JP2021/041588
§ 371 (c)(1),
(2) Date: Jun. 22, 2023

(87) PCT Pub. No.: WO2022/137871
PCT Pub. Date: Jun. 30, 2022

(65) Prior Publication Data

US 2024/0044009 A1 Feb. 8, 2024

(30) Foreign Application Priority Data

Dec. 23, 2020 (JP) ................................ 2020-213377

(51) Int. Cl.
*B05D 1/38* (2006.01)
*B05D 7/14* (2006.01)
*B05D 7/24* (2006.01)
*C23C 22/74* (2006.01)
*C23C 22/77* (2006.01)
*C23C 28/04* (2006.01)

(52) U.S. Cl.
CPC ................ *C23C 22/74* (2013.01); *B05D 1/38* (2013.01); *B05D 7/14* (2013.01); *B05D 7/24* (2013.01); *C23C 22/77* (2013.01); *C23C 28/042* (2013.01)

(58) Field of Classification Search
CPC ... B05D 7/14; B05D 7/52; B05D 7/54; B05D 7/546; B05D 2518/10; B05D 2518/20; B05D 3/007; B05D 3/0254
See application file for complete search history.

(56) References Cited

U.S. PATENT DOCUMENTS

| | | | | |
|---|---|---|---|---|
| 5,922,411 A * | 7/1999 | Shimizu | H01L 21/02343 | 428/688 |
| 8,247,037 B2 * | 8/2012 | Brand | C23C 18/1241 | 427/388.5 |
| 9,793,109 B2 * | 10/2017 | Okamura | C01B 21/087 | |
| 2002/0034885 A1 * | 3/2002 | Shindo | C23C 18/1279 | 438/789 |
| 2003/0049462 A1 | 3/2003 | Oguri et al. | | |
| 2006/0003596 A1 * | 1/2006 | Fucsko | H01L 21/76826 | 438/758 |
| 2010/0166977 A1 * | 7/2010 | Brand et al. | C23C 18/143 | 427/515 |
| 2014/0308513 A1 * | 10/2014 | Miura | B05D 3/0218 | 427/318 |
| 2015/0209826 A1 * | 7/2015 | Bordia | C23C 18/1208 | 427/377 |

FOREIGN PATENT DOCUMENTS

| | | | | |
|---|---|---|---|---|
| JP | H10194753 A | * | 7/1998 |
| JP | 200189126 A | * | 4/2001 |
| JP | 2001181861 A | | 7/2001 |
| JP | 2002105676 A | | 4/2002 |
| JP | 2003112692 A | | 4/2003 |
| JP | 2003118030 A | * | 4/2003 |
| JP | 2006347827 A | | 12/2006 |
| JP | 2009255040 A | * | 11/2009 |
| JP | 2012116960 A | * | 6/2012 |

OTHER PUBLICATIONS

English translation of the ISR issued for PCT/JP2021/041588 dated Jan. 18, 2022 (pp. 1-2).
English translation of the ISR issued for PCT/JP2021/041604 dated Jan. 25, 2022 (pp. 1-2).

* cited by examiner

*Primary Examiner* — William P Fletcher, III
(74) *Attorney, Agent, or Firm* — Millen, White, Zelano & Branigan, P.C.; Csaba Henter; Jennifer L. King

(57) ABSTRACT

A method for forming a coating, which includes: a first step of applying a first solution containing a polysilazane to a surface of a metal substrate, heating the first solution to make the first solution undergo conversion into silica and form a first coating having open defects, on the surface of the metal substrate, and a second step of applying a second solution containing a polysilazane to a surface of the first coating 1 to fill the open defects, and heating the second solution at a temperature lower than a heating temperature in the first step to make the second solution undergo conversion into silica and form a second coating on a surface of the first coating.

10 Claims, 9 Drawing Sheets

METHOD FOR FORMING SILICA-BASED MULTILAYER COATING ON SUBSTRATE FROM POLYSILAZANE-CONTAINING COMPOSTIONS

TECHNICAL FIELD

The present invention relates to a method for forming a coating having corrosion resistance.

BACKGROUND ART

Some constituent members of devices for manufacturing semiconductors, flat panel displays, etc. or devices similar thereto are exposed to corrosive gas or plasma of corrosive gas.

These constituent members are usually formed using a metallic material such as an aluminum alloy or stainless steel, but the metallic material such as an aluminum alloy or stainless steel has low corrosion resistance to a halogen-based corrosive gas or plasma thereof. So, in order to impart corrosion resistance to these members, for example, coating with a silica-based coating using perhydropolysilazane may be applied. The silica-based coating is very dense, and has high corrosion resistance against halogen-based corrosive gases and plasma. Therefore, by forming a silica-based coating on a surface of the constituent member, the surface of the constituent member can be blocked from the external environment, and corrosion of the constituent member can be inhibited.

Incidentally, silica-based coatings formed using perhydropolysilazane are dense but are fragile and are extremely small in coefficient of linear expansion as compared with metal materials. For this reason, there is a problem that cracks are generated in a coating in the process of forming the coating, and constituent members cannot be sufficiently covered when a thin coating is formed in order to inhibit the generation of the cracks, and when the effect of blocking the constituent members from the external environment is reduced, the anticorrosion effect for the constituent members is reduced.

In order to solve such a problem, Patent Literature 1 discloses forming a silica-based coating using a solution comprising perhydropolysilazane and a polyorganosilazane.

In Patent Literature 1, through making the solution contain a polyorganosilazane, a coating more flexible than a silica-based coating formed using only perhydropolysilazane is formed, and occurrence of cracks in the coating is prevented (See, for example, Patent Literature 1).

CITATION LIST

Patent Literature

PATENT LITERATURE 1: Japanese Laid-Open Patent Application No. 2002-105676

SUMMARY OF THE INVENTION

Technical Problem

In Cited Literature 1, since a heat treatment temperature after applying the solution is set to a relatively low temperature (around 300° C.), the coating contains, in addition to silica, etc. obtained through conversion into silica, an unconverted substance. The inclusion of the unconverted substance in the coating contributes to the flexibility of the coating, but decreases the denseness of the coating, so that a sufficiently dense silica-based coating cannot be obtained. In addition, since the heat treatment temperature is 300° C., it is difficult to obtain a coating having sufficient corrosion resistance from a material having a large coefficient of linear expansion, particularly an aluminum alloy.

As described above, with the silica-based coating described in Cited Literature 1, generation of cracks in the coating can be prevented, but a sufficiently dense coating cannot be obtained, and the silica-based coating may be poor in corrosion resistance.

Furthermore, the silica-based coating formed in this way may have pores, and the anticorrosion effect may be deteriorated also when the pores connect the surface side and the constituent member side for some reason.

The present invention has been devised in view of such circumstances, and an object thereof is to provide a technique capable of affording a sufficiently dense coating and forming a coating having high corrosion resistance while preventing decrease in an anticorrosion effect caused by open defects such as cracks or pores.

Solution to Problem (1) A method for forming a coating according to the present invention comprises:

- a first step of applying a first solution comprising a polysilazane to a surface of a metal substrate, heating the first solution to make the first solution undergo conversion into silica and form a first coating having open defects on a surface thereof, on the surface of the metal substrate, and
- a second step of applying a second solution comprising a polysilazane to the surface of the first coating to fill the open defects, and heating the second solution at a temperature lower than a heating temperature in the first step to make the second solution undergo conversion into silica and form a second coating on the surface of the first coating.

According to the method for forming a coating with the above configuration, the first coating has open defects, and the open defects are filled with the second solution by applying the second solution to the surface of the first coating in the second step. Thereafter, the polysilazane contained in the second solution is converted into silica, whereby the second coating can be formed in the open defects. As a result, it is possible to seal at least the openings of the open defects with the second coating, and it is possible to prevent decrease in anticorrosion property caused by the open defects.

Therefore, it is possible to form a dense first coating by converting the polysilazane in the first solution into silica at a sufficiently high temperature without worrying about generation of cracks in the coating in the first step.

In addition, by heating in the second step at a temperature lower than that in the first step, the second coating covering the open defects in the first coating can be formed without generating new cracks in the first coating.

As described above, according to the present invention, it is possible to obtain a sufficiently dense coating and form a coating having high corrosion resistance while preventing decrease in the anticorrosion effect caused by open defects.

(2) A silica-based coating formed using a solution containing a polyorganosilazane contains organic silica having an organic component such as a methyl group. When a silica-based coating containing such organic silica is exposed to a halogen-based gas, an organic portion is selectively corroded, so that corrosion resistance may be poor.

Therefore, in the method for forming a coating, the polysilazane contained in the second solution is preferably perhydropolysilazane.

More preferably, both the polysilazane contained in the first solution and the polysilazane contained in the second solution are perhydropolysilazane.

In this case, a dense coating can be obtained, and a coating having higher corrosion resistance can be formed.

(3) In the method for forming a coating, the concentration ratio of the concentration of the polysilazane contained in the second solution to the concentration of the polysilazane contained in the first solution is preferably 0.001 or more and less than 1.

When the concentration ratio is 1 or more, the viscosity of the second solution becomes relatively high, and there is a possibility that the open defects cannot be filled with the second solution when the second solution is applied to the surface of the first coating in the second step.

When the concentration ratio is less than 0.001, even if the open defects are filled with the second solution, a coating is not sufficiently formed in the open defect, and there is a possibility that the open defects cannot be sealed.

Through setting the concentration ratio to 0.001 or more and less than 1, it is possible to obtain a second solution having viscosity enough to be filled into the open defects and having a concentration at which a coating is sufficiently formed in the open defects.

The concentration ratio of the concentration of the polysilazane contained in the second solution to the concentration of the polysilazane contained in the first solution is more preferably 0.01 or more and less than 0.6.

(4) It is preferable that the second solution comprises at least one among an organic metal, a metal compound, and an amine compound, and a weight ratio of a total amount of the organic metal, the metal compound, and the amine compound to the polysilazane is 0.0001 or more and 1 or less.

The organic metal, the metal compound, and the amine compound are catalysts for lowering the silica conversion temperature of the polysilazane, and when the second solution contains these compounds, the silica conversion temperature of the polysilazane can be lowered, and the heating temperature can be made further lower.

When the weight ratio is less than 0.0001, the effect as a catalyst may not be sufficiently obtained.

In addition, when the weight ratio exceeds 1, thickening (gelation) of the second solution is remarkable, and there is a possibility that the second solution cannot be filled into the open defects in the first coating.

Through setting the weight ratio to 0.0001 or more and 1 or less, it is possible to fill the second solution into the open defects in the first coating and make the second solution appropriately function as a catalyst.

When the weight ratio exceeds 0.2, there is a tendency of thickening (gelation) of the second solution, and thus the weight ratio of the total amount of the organic metal, the metal compound, and the amine compound to the polysilazane is more preferably 0.001 or more and 0.2 or less.

(5) In the method for forming a coating, a total thickness of the first coating and the second coating is preferably 0.01 μm or more and 10.0 μm or less.

When the total thickness is less than 0.01 μm, the surface of the metal substrate may not be sufficiently shielded from the external environment.

When the total thickness exceeds 10.0 μm, stress acting on the first coating increases due to the difference in coefficient of linear expansion between the metal substrate and the first coating, and there is a possibility that peeling occurs with the first coating or internal stress of the first coating may cause peeling of the coating, breakage of the coating, or the like.

Through setting the total thickness of the first coating and the second coating to 0.01 μm or more and 10.0 μm or less, a coating capable of appropriately shielding the surface of the metal substrate from the external environment can be obtained.

The total thickness of the first coating and the second coating is more preferably 0.05 μm or more and 3.0 μm or less.

(6) In the method for forming a coating, the first step may be a step in which the first coating is formed by repeating a prescribed number of times a step of applying the first solution to the metal substrate and a step of heating the first solution to make the first solution undergo conversion into silica.

In this case, the thickness of the first coating can be increased, and the surface of the metal substrate can be sufficiently covered.

(7) In the method for forming a coating, the second step may be a step in which the second coating is formed by repeating a prescribed number of times a step of applying the second solution to the first coating and a step of heating the second solution at a temperature lower than the heating temperature in the first step to make the second solution undergo conversion into silica.

In this case, it is possible to more effectively seal the openings of the open defects.

Advantageous Effects of the Invention

According to the present invention, a coating having high corrosion resistance can be formed.

DETAILED DESCRIPTION

Figure 1:
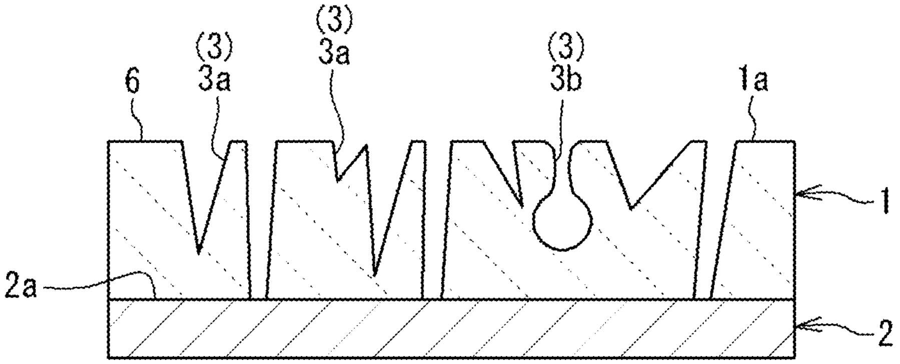
FIG. 1 is a partial cross-sectional view of a metal substrate and a coating after a first coating is formed through a first step.

Hereinafter, the method for forming a coating according to an embodiment of the present invention will be described.

The method for forming a coating according to the present embodiment is a method for forming a silica-based coating using a polysilazane.

The silica-based coating to be obtained in the present embodiment is formed on a constituent member of a chamber, a pipe or the like to be exposed to a halogen-based corrosive gas or plasma of a corrosive gas, in an etching apparatus to be used for the manufacture of a semiconductor or a flat panel display or in an apparatus for the formation of a film such as CVD or PVD.

The method for forming a coating according to the present embodiment comprises a first step of applying a first solution comprising a polysilazane to a surface of a metal substrate and heating the first solution to make the first solution undergo conversion into silica and form a first coating having open defects on a surface thereof, on the surface of the metal substrate, and a second step of applying a second solution comprising a polysilazane to the surface of the first coating to fill the open defects and heating the second solution at a temperature lower than a heating temperature in the first step to make the second solution undergo conversion into silica and form a second coating on the surface of the first coating.

Each step will be described below.

(1)First Step (1-1) Application of First Solution

In the first step, the first solution is applied to the surface of the metal substrate as described above.

The first solution is a polysilazane-containing solution obtained by dissolving a polysilazane in an organic solvent.

As the polysilazane, perhydropolysilazane, polymethylhydrosilazane, poly(N-methylsilazane), poly N-(triethylsilyl)allylsilazane, poly N-(dimethylamino)cyclohexylsilazane, phenylpolysilazane, and the like can be used as a chain polysilazane. Among these, perhydropolysilazane having an average molecular weight of 300 to 5000 is particularly preferable.

Examples of the organic solvent include ethers (e.g., ethyl ether, isopropyl ether, ethyl butyl ether, dibutyl ether, 1,2-dioxyethane, dioxane, dimethyldioxane, tetrahydrofuran, and tetrahydropyran) and hydrocarbons (e.g., pentane, hexane, isohexane, methylpentane, heptane, isoheptane, octane, isooctane, cyclopentane, methylcyclopentane, cyclohexane, methylcyclohexane, benzene, toluene, xylene, and ethylbenzene). One or a mixture of two or more of these ethers and hydrocarbons may be used as the organic solvent.

The concentration of the polysilazane contained in the first solution is preferably 0.05% by mass or more and 40% by mass or less. When the concentration of the polysilazane is less than 0.05% by mass, there is a possibility that a first coating having a sufficient thickness cannot be obtained. When the concentration of the polysilazane exceeds 40% by mass, the viscosity of the first solution is high, and the thickness of the first coating may be uneven. The concentration of the polysilazane contained is more preferably 1% by mass or more and 25% by mass or less.

The first solution may contain a catalyst in addition to the polysilazane. The catalyst has an effect of relatively lowering the temperature at which the polysilazane is converted into silica or increasing the silica conversion rate.

Examples of the catalyst include a metal catalyst (organic metal or metal compound) and an amine-based catalyst (amine compound).

Examples of the metal catalyst include an organic metal or metal compound comprising at least one metal selected from among nickel, titanium, platinum, rhodium, cobalt, iron, ruthenium, osmium, palladium, iridium, and aluminum. In particular, metal carboxylates are preferable from the viewpoint of solubility in the polysilazane-containing solution, stability, and reactivity.

Examples of the amine-based catalyst include amine compounds such as monoamines, diamines, triamines, tetraamines, chain amine residue-containing hydroxyl compounds, and cyclic amine residue-containing hydroxyl compounds.

The amine residue-containing hydroxyl compound reacts with a polysilazane to be converted into an amine residue-containing polysilazane.

When the first solution contains a catalyst (at least one among an organic metal, a metal compound, and an amine compound), the weight ratio of (the total amount of) the catalyst to the polysilazane is preferably 0.0001 or more and 1 or less. When the weight ratio of the catalyst to the polysilazane is less than 0.0001, the effect as a catalyst may not be sufficiently obtained. When the weight ratio of the catalyst to the polysilazane exceeds 1, thickening (gelation) of the first solution is remarkable, and the thickness of the first coating may be uneven. The weight ratio of the catalyst to the polysilazane is more preferably 0.001 or more and 0.2 or less. Through setting the weight ratio of the catalyst to the polysilazane to 0.2 or less, the thickening of the first solution can be effectively inhibited.

Here, the conditions under which the polysilazanes contained in the first solution and the second solution are converted into silica (silica conversion conditions) include such parameters as a heating temperature, a heating time, a heating atmosphere, presence or absence of the catalyst, and the type of the catalyst.

The heating temperature (silica conversion temperature) is determined according to the presence or absence of the catalyst, the type of the catalyst, the heating time, and the heating atmosphere, which are other parameters included in the silica conversion conditions.

In the following description, the silica conversion condition of the polysilazane in the first solution is also referred to as a first silica conversion condition, and the silica conversion temperature of the polysilazane in the first solution is also referred to as a first silica conversion temperature. The silica conversion condition of the polysilazane in the second solution is also referred to as a second silica conversion condition, and the silica conversion temperature of the polysilazane in the second solution is also referred to as a second silica conversion temperature.

In the present embodiment, "a polysilazane is converted into silica" means that the density of a coating obtained by heating a solution containing the polysilazane becomes 2.0 $g/cm^3$ or more.

Therefore, the silica conversion condition is a heating condition under which the density of the first coating or the second coating becomes 2.0 $g/cm^3$ or more.

When the first solution does not contain a catalyst, the first silica conversion temperature is, for example, 300° C. to 550° C.

When the first solution contains a metal catalyst, the first silica conversion temperature is, for example, 120° C. to 350° C.

When the first solution contains an amine-based catalyst, the first silica conversion temperature is, for example, room temperature to 250° C.

The first silica conversion condition including the first silica conversion temperature can be determined by measuring the first solution by the method described below.

The measurement of the first silica conversion condition is carried out by forming a coating on a silicon wafer using the first solution.

First, the weight of the silicon wafer is measured with an electronic balance or the like. The first solution is applied to the silicon wafer by a spin coating method, then the silicon wafer is heated at a prescribed heating temperature for a prescribed heating time in the air to form a silica-based coating, and then the silicon wafer having the silica-based coating formed thereon is weighed. Next, a difference in the weight of the silicon wafer between before and after the formation of the silica-based coating is determined, and this value is defined as the weight of the coating. Next, the thickness of a coating is measured using a known method, and preferably, a more accurate thickness is obtained by measuring from a cross section of the coating with an FE-SEM device or the like. Using the weight and thickness determined for the coating, the density of the coating is calculated in accordance with the formula shown below.

In the method described above, a plurality of combinations of the heating temperature and the heating time are set, and the density of a coating is obtained for each combination. Among the combinations, a combination which affords a density of a coating of 2.0 g/cm$^3$ or more is set as the first silica conversion condition.

$$\text{Density of coating [g/cm}^3\text{]}=\text{weight of coating [g]}/(\text{thickness of coating [}\mu\text{m]}\times\text{surface area of silicon wafer [cm}^2\text{]}\times 0.0001)$$

A silica-based coating obtained by heating a polysilazane under a condition that does not satisfy the silica conversion condition (i.e., heating at a temperature lower than the silica conversion temperature or for a time shorter than the heating time of the silica conversion condition) is not a dense siliceous film due to containing an unconverted substance. The unconverted substance is an intermediate until the conversion from the polysilazane to silica.

The silica-based coating obtained by heating the first solution under the first silica conversion condition contains no unconverted substance. That is, the first silica conversion condition indicates a heating condition under which the polysilazane contained in the first solution is completely converted into silica to afford a sufficiently dense siliceous coating.

Examples of the metal substrate to which the first solution is applied include an etching apparatus and a chamber, piping, or the like of an apparatus for forming a coating as described above. Such a chamber and pipe are formed of stainless steel or an aluminum alloy.

A surface of the metal substrate formed of stainless steel or an aluminum alloy is cleaned and degreased. Thereafter, the first solution is applied to the surface of the metal substrate.

As a pretreatment for applying the first solution, the surface of the metal substrate may be modified by a known method such a UV lamp, an excimer lamp, or irradiation with plasma.

The first solution is applied using a known application method such as a spin coating method, a roll coating method, a flow coating method, a spray coating method, or a dip coating method.

(1-2) Formation of First Coating

Furthermore, in the first step, the first solution applied to the metal substrate is heated in the air or in an atmosphere containing water vapor to convert the polysilazane contained in the first solution into silica and form a first coating. The first coating is a silica-based coating (inorganic siliceous coating) obtained through the conversion into silica of the polysilazane contained in the first solution. The first solution applied to the metal substrate is heated on the basis of a prescribed first silica conversion condition.

The heating temperature in the first step is set to be equal to or higher than the first silica conversion temperature under a prescribed first silica conversion condition. For example, in a case where the prescribed first silica conversion condition is a heating time of 1 hour and a first silica conversion temperature T (T is a certain value), when the heating time of the first step is set to 1 hour, the heating temperature in the first step is set to be equal to or higher than the first silica conversion temperature T.

The heating temperature in the first step is just required to be equal to or higher than the first silica conversion temperature, but is preferably a temperature higher by 10° C. or more, more preferably higher by 30° C. or more than the first silica conversion temperature. When the heating temperature is lower than a value obtained by adding 30° C. to the first silica conversion temperature, the entire of the first solution applied may not reach a temperature equal to or higher than the first silica conversion temperature. Through making the heating temperature be higher by 30° C. or more than the first silica conversion temperature, it is possible to bring the entire first solution to a temperature equal to or higher than the first silica conversion temperature, and possible to appropriately convert the polysilazane in the first solution into silica.

As a result, a sufficiently dense first coating containing no unconverted substance can be obtained, and a silica-based coating superior in corrosion resistance can be obtained.

The heating time in the first step is just required to be a time for which the first solution on the metal substrate is sufficiently heated and the polysilazane in the first solution is converted into silica, and is preferably, for example, 0.5 hours or more and 10 hours or less. If the time is shorter than 0.5 hours, the conversion into silica of the polysilazane in the first solution may be insufficient. If the time exceeds 10 hours, time is unnecessarily consumed, resulting in an increase in cost.

In the first step, the first coating may be formed by repeating a prescribed number of times a step of applying the first solution described above and a step of heating the first solution to make the first solution undergo conversion into silica.

In this case, the thickness of the first coating can be increased, and the surface of the metal substrate can be sufficiently covered.

FIG. 1 is a partial cross-sectional view of a metal substrate and a coating after a first coating is formed through a first step.

In FIG. 1, the first coating 1 is formed on the surface 2*a* of the metal substrate 2. The surface 1*a* of the first coating 1 has a defect-free portion 6 and a plurality of open defects 3. The open defects 3 are defects that open on the surface 2*a*. The open defects 3 includes a crack 3*a* and an open pore 3*b*.

The crack 3*a* is generated mainly due to the difference between the coefficient of linear expansion of the first coating 1 and the coefficient of linear expansion of the metal substrate 2. Cracks 3*a* include those that end in the first coating 1 and those that reach the surface 2*a* of the metal substrate 2.

The open pore 3*b* is generated due to bubbles or the like contained in the first solution in the process of forming the first coating 1.

The first coating 1 is a product resulting from the conversion into silica of the polysilazane in the first solution, and is formed mainly of silica. Therefore, the coefficient of linear expansion of the first coating is an intermediate value between that of inorganic silica glass and that of quartz, and is about 0.6 to 6 ($\times10^{-6}$/° C.).

On the other hand, the metal substrate 2 is stainless steel or an aluminum alloy, and as an example, JIS SUS 316L, which is stainless steel, has a coefficient of linear expansion of 16.0 ($\times10^{-6}$/° C.), and JIS A 6061, which is an aluminum alloy, has a coefficient of linear expansion of 23.6 ($\times10^{-6}$/° C.).

In the first step, the first coating 1 is formed by heating the metal substrate 2 to which the first solution has been applied to a temperature equal to or higher than the silica conversion temperature of the polysilazane in the first solution. Therefore, when the metal substrate 2 is cooled to normal temperature after heating, stress acts on the first coating 1 due to a difference in coefficient of linear expansion between the first coating 1 and the metal substrate 2. Cracks 3*a* are generated in the first coating 1 by this stress.

(2) Second Step (2-1) Application of Second Solution

In the second step, the second solution is applied to a surface of the first coating.

Figure 2:
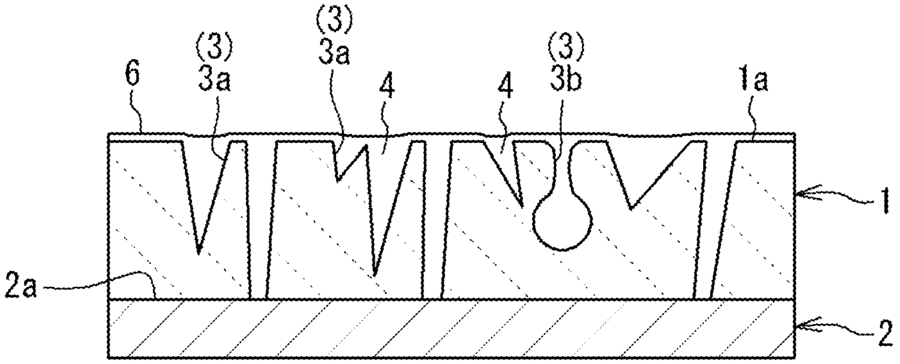
FIG. 2 is a partial cross-sectional view of a metal substrate and a coating after applying a second solution to a surface of a first coating through a second step.

FIG. 2 is a partial cross-sectional view of a metal substrate and a coating after applying a second solution to a surface of a first coating through a second step.

As illustrated in FIG. 2, the open defects 3 are filled with the second solution 4 by applying the second solution 4 to the surface 1*a* of the first coating 1.

The second solution is a polysilazane-containing solution obtained by dissolving a polysilazane in an organic solvent.

As the polysilazane, perhydropolysilazane, polymethylhydrosilazane, poly(N-methylsilazane), poly N-(triethylsilyl)allylsilazane, poly N-(dimethylamino)cyclohexylsilazane, phenylpolysilazane, and the like can be used as a chain polysilazane. Among these, perhydropolysilazane having an average molecular weight of 300 to 5000 is particularly preferable.

As the organic solvent, an organic solvent the same as that of the first solution can be employed and examples thereof include ethers (e.g., ethyl ether, isopropyl ether, ethyl butyl ether, dibutyl ether, 1,2-dioxyethane, dioxane, dimethyldioxane, tetrahydrofuran, and tetrahydropyran) and hydrocarbons (e.g., pentane, hexane, isohexane, methylpentane, heptane, isoheptane, octane, isooctane, cyclopentane, methylcyclopentane, cyclohexane, methylcyclohexane, benzene, toluene, xylene, and ethylbenzene). One or a mixture of two or more of these ethers and hydrocarbons may be used as the organic solvent.

The concentration of the polysilazane contained in the second solution is preferably 0.05% by mass or more and 40% by mass or less. When the concentration of the polysilazane is less than 0.05% by mass, there is a possibility that a second coating having the minimum required thickness cannot be obtained. When the concentration of the polysilazane exceeds 40% by mass, the viscosity of the second solution is high, and the thickness of the second coating may be uneven.

The concentration of the polysilazane contained is more preferably 1% by mass or more and 25% by mass or less.

The concentration ratio of the concentration of the polysilazane contained in the second solution to the concentration of the polysilazane contained in the first solution is preferably 0.001 or more and less than 1.

When the concentration ratio is 1 or more, the viscosity of the second solution becomes relatively high, and there is a possibility that the open defects 3 are not filled with the second solution when the second solution is applied to the surface of the first coating in the second step.

In addition, when the concentration ratio is less than 0.001, even if the open defects 3 are filled with the second solution, a coating is not sufficiently formed in the open defect 3, and there is a possibility that the open defects cannot be sealed.

Through setting the concentration ratio to 0.001 or more and less than 1, it is possible to obtain a second solution having viscosity enough to be filled into the open defects 3 and having a concentration at which a coating is sufficiently formed in the open defects 3.

The concentration ratio of the concentration of the polysilazane contained in the second solution to the concentration of the polysilazane contained in the first solution is more preferably 0.01 or more and less than 0.6.

In addition, the concentration ratio of the concentration of the polysilazane contained in the second solution to the concentration of the polysilazane contained in the first solution may be 1 or more and 200 or less.

When the concentration ratio is more than 200, the viscosity of the second solution becomes high, so that the second solution cannot be uniformly applied and the thickness of the second coating may be uneven.

When the concentration ratio is less than 1, there is a possibility that a second coating having a sufficient thickness cannot be obtained.

Through setting the concentration ratio to 1 or more and 200 or less, even if the first coating is an extremely thin coating (for example, less than 0.01 μm in thickness), it is possible to obtain a second coating that can complement the first coating to sufficiently cover the metal substrate.

The second solution preferably contains a catalyst in addition to the polysilazane. When the second solution contains a catalyst, the heating temperature under the silica conversion condition in the second step can be easily set to a temperature lower than the heating temperature under the silica conversion condition in the first step.

As the catalyst, a catalyst the same as that of the first solution can be employed and examples thereof include a metal catalyst (organic metal or metal compound) and an amine-based catalyst (amine compound).

Examples of the metal catalyst include an organic metal or metal compound comprising at least one metal selected from among nickel, titanium, platinum, rhodium, cobalt, iron, ruthenium, osmium, palladium, iridium, and aluminum. In particular, metal carboxylates are preferable from the viewpoint of solubility in the polysilazane-containing solution, stability, and reactivity.

Examples of the amine-based catalyst include amine compounds such as monoamines, diamines, triamines, tetraamines, chain amine residue-containing hydroxyl compounds, and cyclic amine residue-containing hydroxyl compounds.

When the second solution contains a catalyst (at least one among an organic metal, a metal compound, and an amine compound), the weight ratio of (the total amount of) the catalyst to the polysilazane is preferably 0.0001 or more and 1 or less. When the weight ratio of the catalyst to the polysilazane is less than 0.0001, the effect as a catalyst may not be sufficiently obtained. When the weight ratio of the catalyst to the polysilazane exceeds 1, thickening (gelation) of the second solution becomes remarkable, so that not only the coating thickness becomes uneven but also the second solution may not be filled into the open defects 3 on the surface of the first coating. The weight ratio of the catalyst to the polysilazane is more preferably 0.001 or more and 0.2 or less. Through setting the weight ratio of the catalyst to the polysilazane to 0.2 or less, the thickening of the second solution can be effectively inhibited.

When the second solution does not contain a catalyst, the second silica conversion temperature is, for example, 300° C. to 550° C.

When the second solution contains a metal catalyst, the second silica conversion temperature is, for example, 120° C. to 350° C.

When the second solution contains an amine-based catalyst, the second silica conversion temperature is, for example, room temperature to 250° C.

For example, when the first solution does not contain a catalyst, the first silica conversion temperature is 300° C. to 550° C., and the second solution may or may not contain a catalyst as long as the condition that the heating temperature in the second step is lower than the heating temperature in the first step is satisfied.

When the first solution contains palladium, which is a metal catalyst, the first silica conversion temperature is, for example, 120° C. to 350° C. In this case, the second solution preferably contains a catalyst. When no catalyst is contained, the second silica conversion temperature is 300° C. to 550° C., and it becomes difficult to satisfy the condition that the heating temperature in the second step is lower than the heating temperature in the first step.

The second silica conversion condition including the second silica conversion temperature can be determined through measurement for the second solution by the same method as the method for measuring the first silica conversion condition.

In the present embodiment, the second silica conversion condition is a condition including a second silica conversion temperature of a value equal to or lower than the first silica conversion temperature included in the prescribed first silica conversion condition.

The second solution is applied using a known application method such as a spin coating method, a roll coating method, a flow coating method, a spray coating method, or a dip coating method.

(2-2) Formation of Second Coating

Furthermore, in the second step, the second solution applied to the surface of the first coating is heated in the air or in an atmosphere containing water vapor to convert the polysilazane contained in the second solution into silica and form a second coating. The second coating is a silica-based coating (inorganic siliceous coating) obtained through the conversion into silica of the polysilazane contained in the second solution.

The heating temperature in the second step is set to a temperature lower than the heating temperature in the first step and equal to or higher than the second silica conversion temperature.

When the heating temperature is equal to or higher than the heating temperature in the first step, the first coating is to be heated to a temperature equal to or higher than the temperature at which the first coating is formed, and there is a possibility that a new crack is generated in the first coating due to a difference in coefficient of linear expansion between the metal substrate and the first coating when the first coating is cooled to normal temperature.

When the heating temperature is lower than the second silica conversion temperature, the conversion into silica of the polysilazane contained in the second solution may not be sufficiently carried out.

Through setting the heating temperature to a temperature lower than the heating temperature in the first step and equal to or higher than the second silica conversion temperature, the polysilazane in the second solution can be appropriately converted into silica without applying stress to the first coating.

The heating time in the second step is just required to be a time for which the second solution on the first coating is sufficiently heated and the polysilazane in the second solution is converted into silica, and is preferably, for example, 0.5 hours or more and 10 hours or less. If the time is shorter than 0.5 hours, the conversion into silica of the polysilazane in the second solution may be insufficient. If the time exceeds 10 hours, time is unnecessarily consumed, resulting in an increase in cost.

The second step may be a step in which the second coating is formed by repeating a prescribed number of times a step of applying the second solution described above and a step of heating the second solution at a temperature lower than the heating temperature in the first step to make the second solution undergo conversion into silica.

Figure 3:
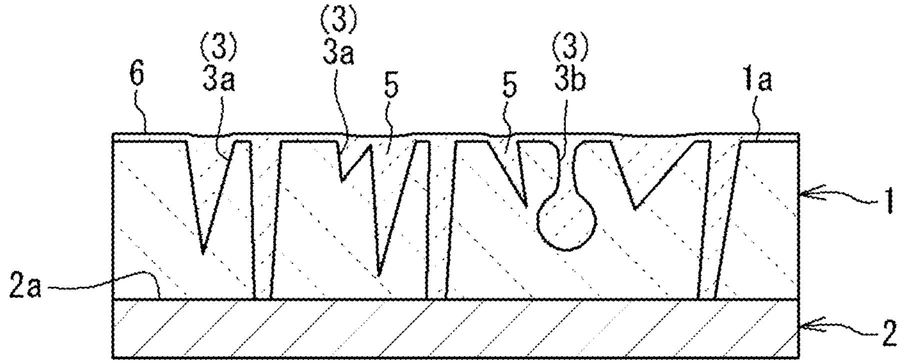
FIG. 3 is a partial cross-sectional view of a metal substrate and a coating after a second coating is formed through a second step.

FIG. 3 is a partial cross-sectional view of a metal substrate and a coating after a second coating is formed through a second step.

When the metal substrate coated to which the second solution has been applied is heated in the second step, the polysilazane contained in the second solution filled in the open defects 3 is converted into silica. Thus, as illustrated in FIG. 3, a second coating 5 is formed on the open defects 3.

As a result, the open defects 3 on the surface 1*a* of the first coating 1 are sealed with the second coating.

The second coating 5 is just required to be formed at least on the open defects 3 of the surface 1*a* and seal the open defects 3, and the second coating 5 may be formed on a part other than the open defects 3 (for example, on a defect-free portion 6).

As described above, according to the method for forming a coating with the above configuration, the first coating has open defects 3, and the open defects 3 is filled with the second solution by applying the second solution to the surface of the first coating in the second step. Thereafter, the polysilazane contained in the second solution is converted into silica, whereby the second coating can be formed in the open defects 3. As a result, it is possible to seal the open defects 3 with the second coating, and it is possible to prevent decrease in anticorrosion property caused by the open defects 3.

Therefore, it is possible to form a dense first coating by converting the polysilazane in the first solution into silica at a sufficiently high temperature without worrying about generation of cracks in the coating in the first step.

In addition, by heating in the second step at a temperature lower than that in the first step, the second coating covering the open defects in the first coating can be formed without generating new cracks in the first coating.

As described above, according to the present embodiment, it is possible to obtain a sufficiently dense coating and form a coating having high corrosion resistance while preventing decrease in the anticorrosion effect caused by open defects 3.

When the second step is a step in which the second coating is formed by repeating a prescribed number of times a step of applying the second solution and a step of heating the second solution at a temperature lower than the heating temperature in the first step to make the second solution undergo conversion into silica, the open defects 3 can be sealed more effectively.

As the polysilazane contained in the second solution, perhydropolysilazane is particularly preferable as described above.

When the polysilazane contained in the second solution is perhydropolysilazane, a dense second coating can be obtained, and a coating having higher corrosion resistance can be formed.

In the present embodiment, a total thickness of the first coating and the second coating is preferably 0.01 μm or more and 10.0 μm or less.

When the total thickness is less than 0.01 μm, the surface of the metal substrate may not be sufficiently shielded from the external environment.

When the total thickness exceeds 10.0 μm, stress acting on the first coating increases due to the difference in coefficient of linear expansion between the metal substrate and the first coating, and there is a possibility that peeling occurs with the first coating or internal stress of the first coating may cause peeling of the coating, breakage of the coating, or the like.

Through setting the total thickness of the first coating and the second coating to 0.01 μm or more and 10.0 μm or less, a coating capable of appropriately shielding the surface of the metal substrate from the external environment can be obtained.

The total thickness of the first coating and the second coating is more preferably 0.05 μm or more and 3.0 μm or less.

EXAMPLES

Hereinafter, the present invention will be described in more detail with reference to Examples, but the present invention is not limited to the following Examples.

Example 1

As the first solution, a dibutyl ether solution (manufactured by Merck Performance Materials, Inc., trade name: Durazane 2400) containing a metal catalyst (palladium) and having a concentration of perhydropolysilazane of 20% by mass was used. As the first silica conversion condition in the first solution, a value determined by the above-described measurement method was used, and the first silica conversion temperature was determined to be 150° C. for a heating time of 1 hour.

As the second solution, a solution prepared to have a concentration of perhydropolysilazane of 10% by mass from a dibutyl ether solution (manufactured by Merck Performance Materials, Inc., trade name: Durazane 2400) containing a metal catalyst (palladium) and having a concentration of perhydropolysilazane of 20% by mass was used. Therefore, the concentration ratio of the concentration of perhydropolysilazane in the second solution to the concentration of perhydropolysilazane in the first solution was 0.5.

As the second silica conversion condition in the second solution, a value determined by the above-described measurement method was used, and the second silica conversion temperature was determined to be 150° C. for a heating time of 1 hour.

As the metal substrate, a plate of stainless steel (JIS SUS 316L) having a size of 50 mm×50 mm and a thickness of 5 mm was prepared.

A surface of the metal substrate was degreased and washed, the first solution was then applied thereto by a spin coating method, heated at 250° C. for 1 hour, and after 1 hour, taken out from the heating furnace and cooled in the air. As a result, a first coating having open defects was formed on the surface of the metal substrate.

Thereafter, the second solution was applied to the surface of the first coating by a spin coating method, and heated for 1 hour at 150° C., which is the second silica conversion temperature. As a result, a second coating was formed on the surface of the first coating, and a test piece in which the first coating and the second coating (total thickness: 1.7 to 1.8 μm) were formed on the metal substrate was obtained.

At this time, the density of the first coating was 2.31 g/cm$^3$, and the density of the second coating was 2.14 g/cm$^3$. Therefore, both the first coating and the second coating had been converted into silica. The densities of these coatings were determined by measuring the densities of coatings heated under the same conditions by the above-described measurement method.

Example 2

As the first solution, a dibutyl ether solution (manufactured by Merck Performance Materials, Inc., trade name: Durazane 2400) containing a metal catalyst (palladium) and having a concentration of perhydropolysilazane of 20% by mass was used. As the first silica conversion condition in the first solution, a value determined by the above-described measurement method was used, and the first silica conversion temperature was determined to be 150° C. for a heating time of 1 hour.

As the second solution, a solution prepared to have a concentration of perhydropolysilazane of 5% by mass from a dibutyl ether solution (manufactured by Merck Performance Materials, Inc., trade name: Durazane 2400) containing a metal catalyst (palladium) and having a concentration of perhydropolysilazane of 20% by mass was used. Therefore, the concentration ratio of the concentration of perhydropolysilazane in the second solution to the concentration of perhydropolysilazane in the first solution was 0.25.

As the second silica conversion condition in the second solution, a value determined by the above-described measurement method was used, and the second silica conversion temperature was determined to be 130° C. for a heating time of 2 hours.

As the metal substrate, a plate of an aluminum alloy (JIS A 6061) having a size of 50 mm×50 mm and a thickness of 5 mm was prepared.

A surface of the metal substrate was degreased and washed, the first solution was then applied thereto by a spin coating method, heated at 250° C. for 1 hour, and after 1 hour, taken out from the heating furnace and cooled in the air. As a result, a first coating having open defects was formed on the surface of the metal substrate.

Thereafter, the second solution was applied to the surface of the first coating by a spin coating method, and heated for 2 hours at 130° C., which is the second silica conversion temperature. As a result, a second coating was formed on the surface of the first coating, and a test piece in which the first coating and the second coating (total thickness: 1.4 to 1.5 μm) were formed on the metal substrate was obtained.

At this time, the density of the first coating was 2.31 g/cm$^3$, and the density of the second coating was 2.21 g/cm$^3$. Therefore, both the first coating and the second coating had been converted into silica.

Comparative Example

As the first solution, a dibutyl ether solution (manufactured by Merck Performance Materials, Inc., trade name:

Durazane 2400) containing a metal catalyst (palladium) and having a concentration of perhydropolysilazane of 20% by mass was used. As the first silica conversion condition in the first solution, the first silica conversion temperature was determined to be 250° C. for a heating time of 1 hour on the basis of the data disclosed by the manufacturer.

As the metal substrate, a plate of stainless steel (JIS SUS 316L) having a size of 50 mm×50 mm and a thickness of 5 mm was prepared.

A surface of the metal substrate was degreased and washed, the first solution was applied thereto by a spin coating method, and heated for 1 hour at 250° C., which is the first silica conversion temperature. As a result, a test piece in which a first coating (thickness: 1.2 to 1.3 μm) was formed on the metal substrate was obtained.

[Observation of Cross Section and Surface of Coating]

Each of the test pieces obtained in Examples 1 and 2 and Comparative Example was cut with a high-speed cutter, and the obtained cut piece was embedded in a resin, subjected to ion milling (IM400 manufactured by Hitachi High-Tech Corporation), and a cross section of the coating was observed using an FE-SEM (SU8020 manufactured by Hitachi High-Tech Corporation). In addition, the coating surface of each of the test pieces obtained in Examples 1 and 2 and Comparative Example was observed using an FE-SEM.

Figure 4:
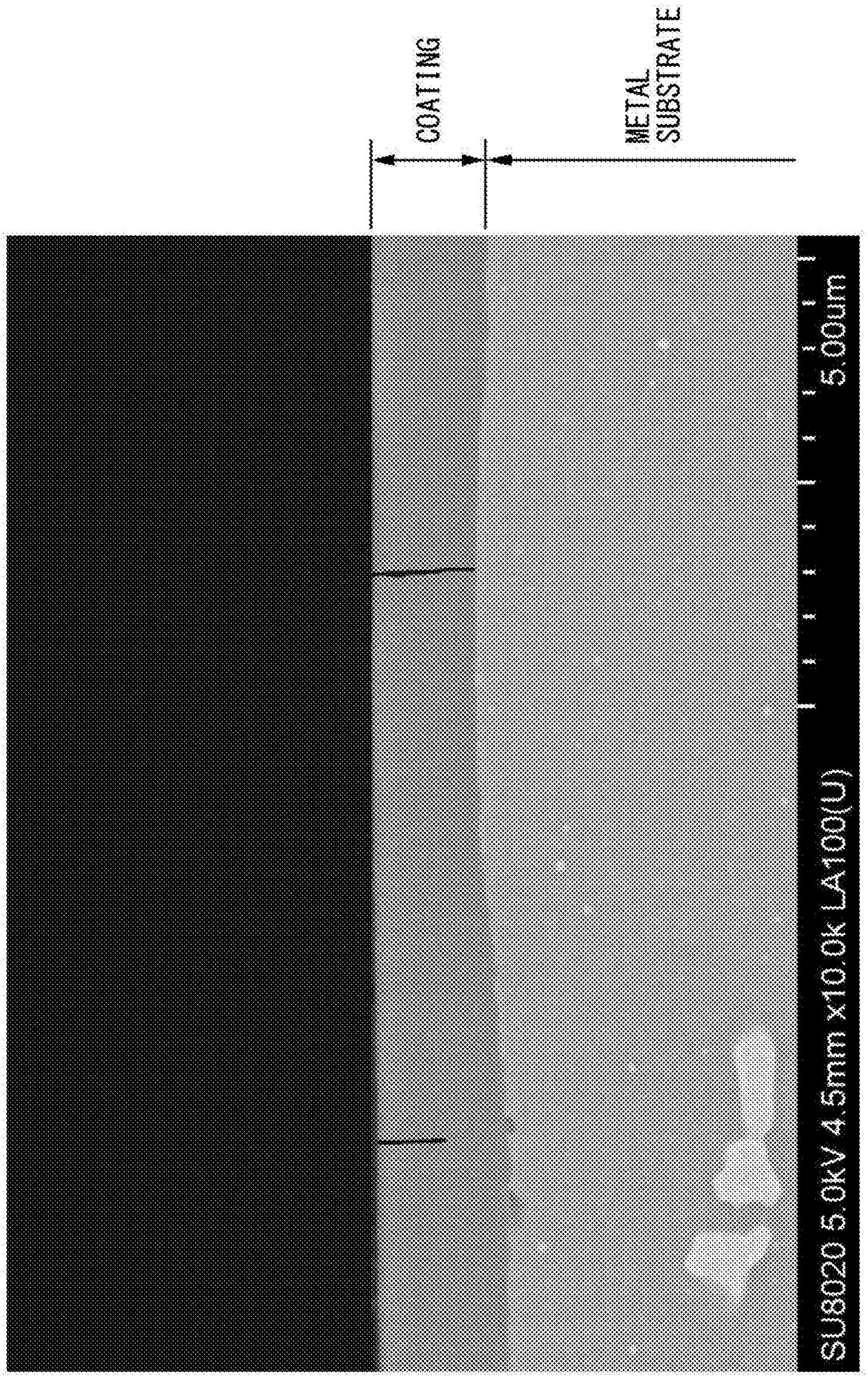
FIG. 4 is an electron micrograph of a cross section of the coating according to Comparative Example.
Figure 5:
FIG. 5 is an electron micrograph of a surface of the coating according to Comparative Example.

FIG. 4 is an electron micrograph of a cross section of the coating according to Comparative Example, and FIG. 5 is an electron micrograph of a surface of the coating according to Comparative Example.

As shown in FIGS. 4 and 5, it is found that there are a large number of cracks on the surface of the first coating.

Figure 6:
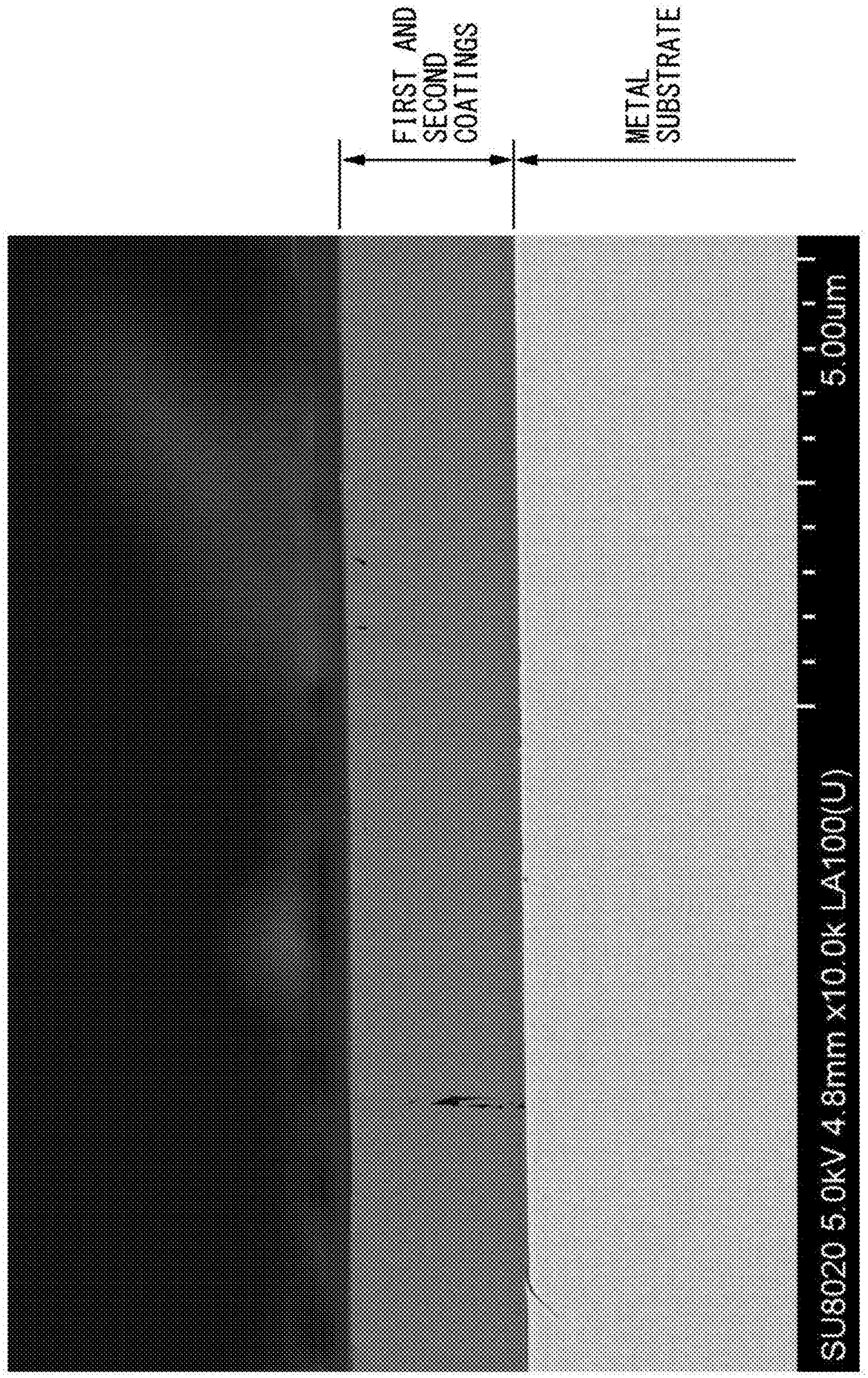
FIG. 6 is an electron micrograph of a cross section of the coating according to Example 1.
Figure 7:
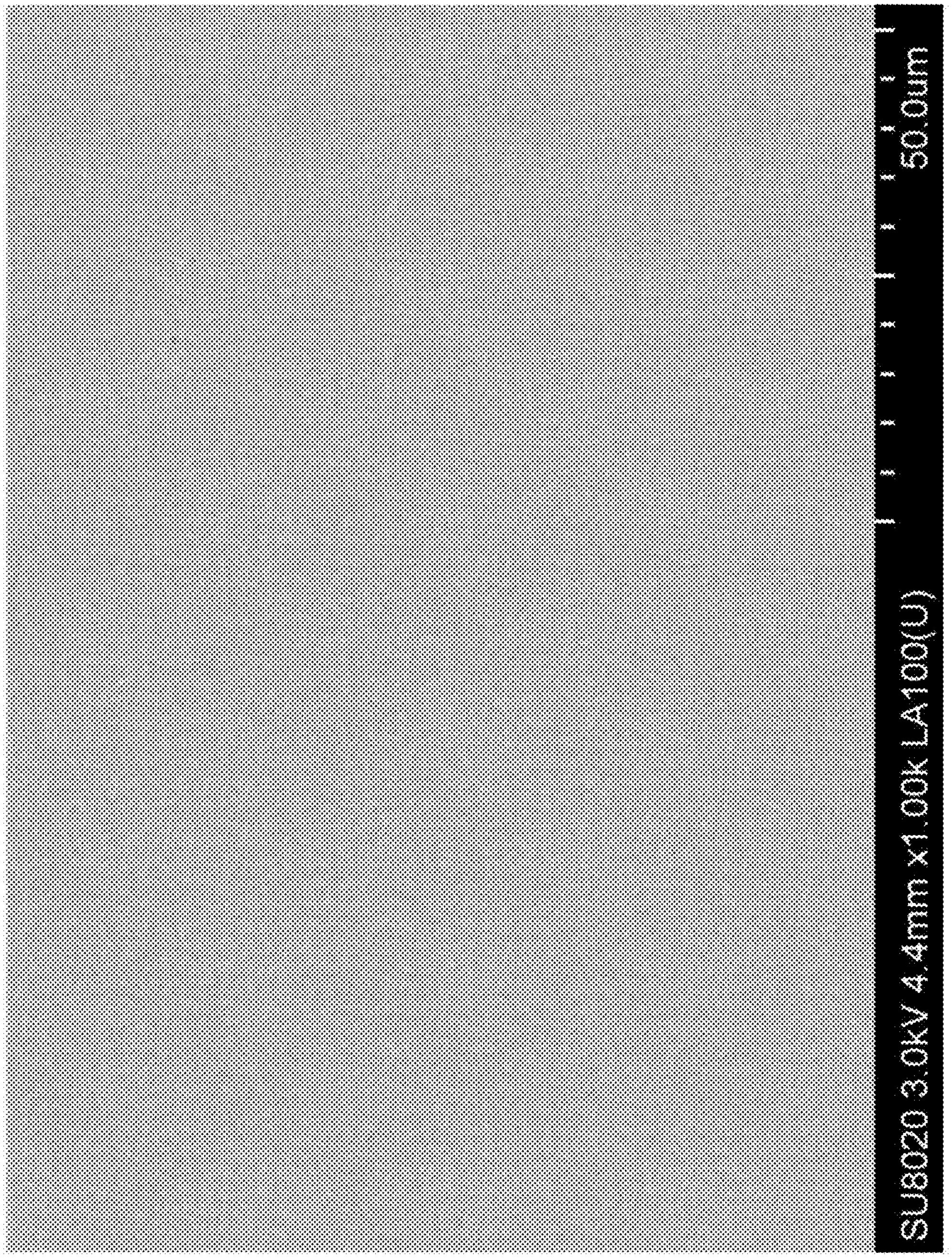
FIG. 7 is an electron micrograph of a surface of the coating according to Example 1.

FIG. 6 is an electron micrograph of a cross section of the coating according to Example 1, and FIG. 7 is an electron micrograph of a surface of the coating according to Example 1.

Figure 8:
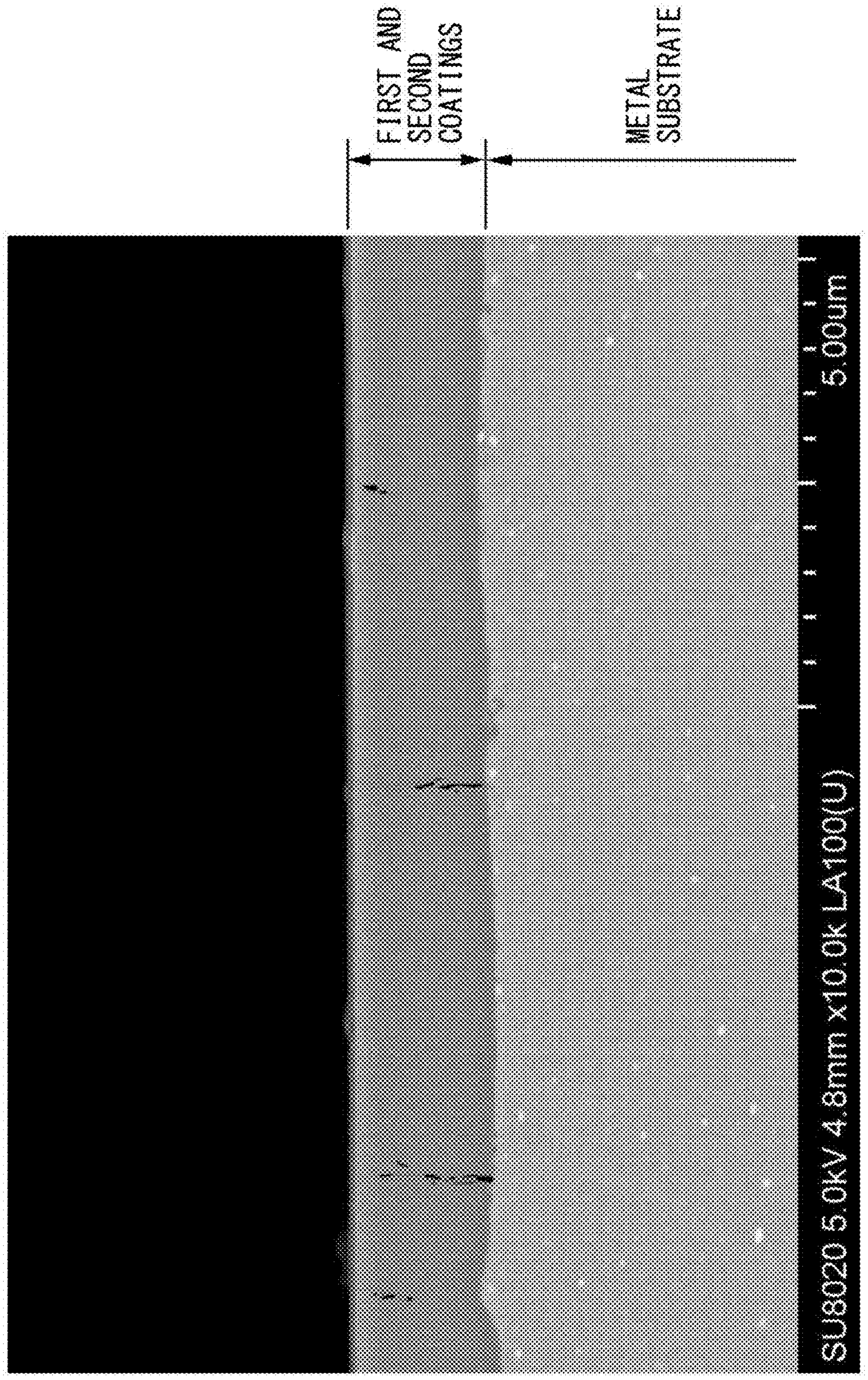
FIG. 8 is an electron micrograph of a cross section of the coating according to Example 2.
Figure 9:
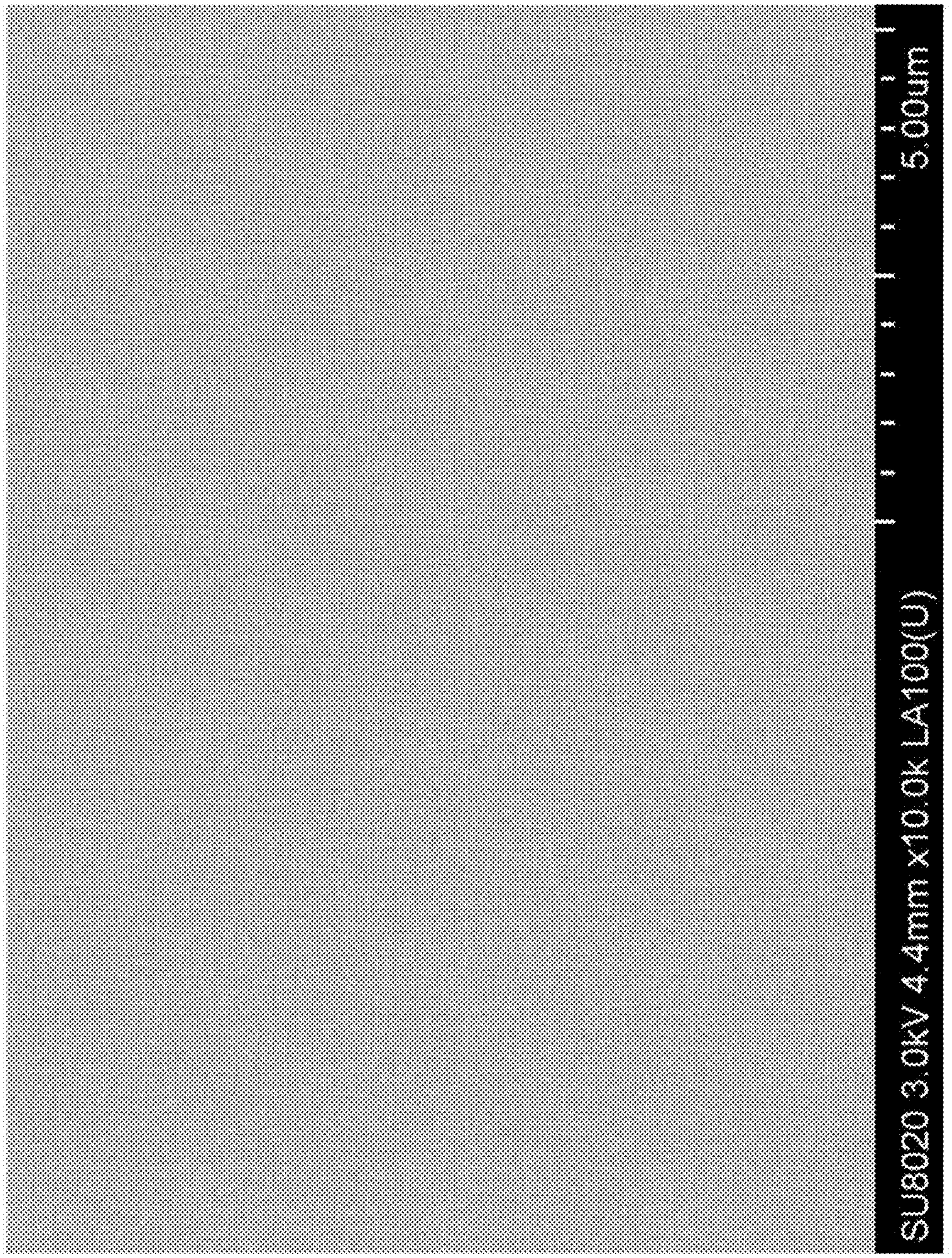
FIG. 9 is an electron micrograph of a surface of the coating according to Example 2.

FIG. 8 is an electron micrograph of a cross section of the coating according to Example 2, and FIG. 9 is an electron micrograph of a surface of the coating according to Example 2.

As shown in FIGS. 6 to 9, in Example 1 and Example 2, it can be seen that the cracks found in Comparative Example are sealed.

[Hydrochloric Acid Corrosion Resistance Test]

Each of the test pieces obtained in Examples 1 and 2 and Comparative Example was masked such that only the surface on which the coating was formed was exposed, and each of the masked test pieces was immersed in a 10% hydrochloric acid solution at normal temperature for 24 hours, and the corrosion state of the surface on which the coating was formed was observed.

The results are shown in Table 1 below.

TABLE 1

| | Presence or absence of corrosion |
|---|---|
| Example 1 | Absent |
| Example 2 | Absent |
| Comparative Example | Present |

As shown in Table 1, corrosion was observed and partial peeling occurred in Comparative Example having the first coating on which no second coating was formed, but corrosion was not observed in Examples 1 and 2 with a second coating formed.

This reveals that cracks of the first coating are sealed and decrease in an anticorrosion effect caused by the cracks can be prevented.

In addition, it is found that the first coating and the second coating have high corrosion resistance in a hydrochloric acid solution.

REFERENCE SIGNS LIST

1 first coating
1*a* surface
2 metal substrate
2*a* surface
3 open defect
3*a* crack
3*b* open pore
4 second solution
5 second coating
6 defect-free portion

The invention claimed is:

1. A method for forming a coating comprising:

a first step of applying a first solution comprising a polysilazane consisting of perhydropolysilazane to a surface of a metal substrate, heating the first solution to make the first solution undergo conversion into silica and form a first coating having a crack or an open pore on a surface thereof, and a second step of applying a second solution comprising a polysilazane consisting of perhydropolysilazane to the surface of the first coating to fill the crack or the open pore, and heating the second solution at a temperature lower than a heating temperature in the first step to make the second solution undergo conversion into silica and form a second coating on the surface of the first coating.

2. The method for forming a coating according to claim 1, wherein a concentration ratio of a concentration of the polysilazane in the second solution to a concentration of the polysilazane in the first solution is 0.001 or more and less than 1.

3. The method for forming a coating according to claim 1, wherein the second solution comprises at least one among an organic metal, a metal compound, and an amine compound, and a weight ratio of a total amount of the organic metal, the metal compound, and the amine compound to the polysilazane is 0.0001 or more and 1 or less.

4. The method for forming a coating according to claim 1, wherein a total thickness of the first coating and the second coating is 0.01 μm or more and 10.0 μm or less.

5. The method for forming a coating according to claim 1, wherein in the first step, the first coating is formed by repeating a prescribed number of times the step of applying the first solution to the metal substrate and the step of heating the first solution to make the first solution undergo conversion into silica.

6. The method for forming a coating according to claim 1, wherein in the second step, the second coating is formed by repeating a prescribed number of times the step of applying the second solution to the first coating and the step of heating the second solution at a temperature lower than the heating temperature in the first step to make the second solution undergo conversion into silica.

7. The method for forming a coating according to claim 1, wherein the first solution comprises an organic metal or a metal compound and the heating temperature in the first step is in a range of 120° C. to 350° C.

8. The method for forming a coating according to claim 1, wherein the second solution comprise an organic metal or a metal compound and the heating temperature in the second step is in a range of 120° C. to 350° C.

9. The method for forming a coating according to claim 1, wherein the first solution comprises an amine compound and the heating temperature in the first step is in a range of room temperature to 250° C.

10. The method for forming a coating according to claim 1, wherein the second solution comprises an amine compound and the heating temperature in the second step is in a range of room temperature to 250° C.

* * * * *